United States Patent
Xie et al.

(10) Patent No.: US 12,485,529 B2
(45) Date of Patent: Dec. 2, 2025

(54) ADSORPTION PARALLEL MACHINING ROBOT

(71) Applicant: TSINGHUA UNIVERSITY, Beijing (CN)

(72) Inventors: Fugui Xie, Beijing (CN); Xinjun Liu, Beijing (CN); Zijian Ma, Beijing (CN)

(73) Assignee: TSINGHUA UNIVERSITY (CN)

( * ) Notice: Subject to any disclaimer, the term of this patent is extended or adjusted under 35 U.S.C. 154(b) by 322 days.

(21) Appl. No.: 17/610,966

(22) PCT Filed: Feb. 19, 2021

(86) PCT No.: PCT/CN2021/076894
§ 371 (c)(1),
(2) Date: Aug. 14, 2023

(87) PCT Pub. No.: WO2022/001129
PCT Pub. Date: Jan. 6, 2022

(65) Prior Publication Data
US 2023/0398681 A1 Dec. 14, 2023

(30) Foreign Application Priority Data

Jun. 28, 2020 (CN) .......................... 202010594261.6

(51) Int. Cl.
*B25J 9/00* (2006.01)
*B25J 11/00* (2006.01)

(52) U.S. Cl.
CPC ............. *B25J 9/003* (2013.01); *B25J 11/005* (2013.01)

(58) Field of Classification Search
CPC ........ B25J 9/0051; B25J 9/003; B25J 11/005; B25J 5/007; B23Q 1/5462
See application file for complete search history.

(56) References Cited

U.S. PATENT DOCUMENTS 5,468,099 A * 11/1995 Wheetley ................ B23B 39/04
    408/1 R
5,787,758 A *  8/1998 Sheldon ................. B25J 9/0078
    901/22

(Continued)

FOREIGN PATENT DOCUMENTS

CN   101704241 A    5/2010
CN   102294502 A    12/2011

(Continued)

OTHER PUBLICATIONS

JP2017-13160 A—machine translation (Year: 2017).*

(Continued)

*Primary Examiner* — Jake Cook
(74) *Attorney, Agent, or Firm* — Jaffery Watson Hamilton & DeSanctis LLP (57) ABSTRACT

An adsorption parallel machining robot includes a machining module and an adsorption module. The machining module includes a fixed platform, a movable platform, multiple branch chains and end effector; multi-degree-of-freedom motion is achieved through linear motion of the multiple branch chains. The adsorption module includes multiple fixed adsorption branch chains, each of which includes a connecting bracket, an adsorption device, an adsorption locking device, an omnidirectional wheel and a driving device, and is used for achieving adsorption and movement of the robot on the surface of a workpiece. Besides the locking function, the locking device additionally has a cleaning function, and residual cutting chips on the robot can be removed. The robot has the beneficial effects of flexible local posture adjustment, high processing efficiency, wide processing range, easy disassembly and assembly, good portability and low energy consumption, which can (Continued)

meet the demand for mobile processing of large components.

20 Claims, 11 Drawing Sheets

(56) References Cited

U.S. PATENT DOCUMENTS

| 10,040,151 | B2* | 8/2018 | Axinte | B23Q 9/0014 |
| 2014/0263883 | A1* | 9/2014 | Rushworth | B25J 17/0216 |
| | | | | 248/163.1 |

FOREIGN PATENT DOCUMENTS

| CN | 103192365 A | | 7/2013 | | |
| CN | 103753355 A | | 4/2014 | | |
| CN | 104354782 A | | 2/2015 | | |
| CN | 204843507 U | * | 12/2015 | | |
| CN | 108098784 A | | 6/2018 | | |
| CN | 108247604 A | | 7/2018 | | |
| CN | 108340198 A | | 7/2018 | | |
| CN | 109176459 A | | 1/2019 | | |
| CN | 111687864 A | | 9/2019 | | |
| CN | 110509257 A | | 11/2019 | | |
| CN | 110509258 A | | 11/2019 | | |
| DE | 19920776 A1 | * | 11/1999 | ........... | B23Q 1/5462 |
| DE | 102012008744 A1 | | 11/2013 | | |
| JP | S62201357 A | | 9/1987 | | |
| JP | 2017013160 A | * | 1/2017 | .............. | B25J 13/08 |

OTHER PUBLICATIONS

CN-204843507-U Machine Translation (Year: 2015).*
DE-19920776-A1 Machine Translation (Year: 1999).*
First Notification of Office Action, CNIPA, Nov. 13, 2020, 8 pages.
International Search Report, CNIPA, May 27, 2021, 5 pages.

* cited by examiner

ADSORPTION PARALLEL MACHINING ROBOT

CROSS-REFERENCE TO RELATED APPLICATION

The present application is a national stage application of PCT/CN2021/076894 filed on Feb. 19, 2021; which claims priority to Chinese Application No. 202010594261.6 filed on Jun. 28, 2020, entitled "Adsorption Parallel Machining Robot," the disclosure of which is hereby incorporated by reference in its entirety.

FIELD OF TECHNOLOGY

The present application relates to the technical field of machining robots for large workpiece, in particular to an adsorption parallel machining robot.

BACKGROUND

With the gradual implementation of major engineering projects in key technical fields such as aerospace and energy, large structural parts have gradually become the critical core components, and there is a huge demand for them. There are many shortcomings such as difficulty in workpiece transportation and positioning, difficulty in manufacturing large machine tools, high maintenance costs of processing equipment and high processing energy consumption when using a traditional processing method, namely using large special-purpose machine tools for inclusive processing of workpieces.

The adsorption machining robot based on the mobile machining concept is a new approach to solve the above problems, the principle of which is to complete the processing of the large component by the machining robot adsorbing on the position to be processed of the large workpiece. However, the traditional adsorption machining robots have the following defects: (1) for traditional fixed adsorption machining robots, the robot needs to be manually positioned at the position to be processed for adsorption, which is not only inefficient but also a safety hazard when large components have more surfaces to be processed or are fixed in high positions. (2) the traditional mobile adsorption machining robot lacks a locking device, and only relies on its own adsorption force to resist the force generated by the processing, such that for processing tasks such as welding, rust removal and painting, its own adsorption force is still sufficient; but when drilling and milling, the robot will produce small skidding or large movements during processing without adding a locking device, which will seriously affect the processing accuracy and quality. (3) The cutting chips produced by the adsorption machining robot have a variety of effects on the processing quality, for example, the cutting chips remaining in the adsorption device affect the next adsorption effect, resulting in poor adsorption and affecting subsequent processing accuracy; cutting chips remaining on the tool have a great impact on the surface quality of subsequent processing; cutting chips remaining in the locking device not only affect the adsorption and locking effect, but are also prone to scratch the surface of the workpiece.

SUMMARY

Based on the above-mentioned background, the present application proposes a movable adsorption parallel machining robot with cleaning function which includes an adsorption locking device, and the machining module adopts a multi-degree-of-freedom parallel mechanism. The coordinated work of each function of the robot enables better accuracy, wider use range and higher processing efficiency.

Technical solutions of the present application are as follows:

Technical Solution 1: an adsorption parallel machining robot, including:

a machining module which includes a fixed platform, a movable platform, a plurality of branch chains and end effector; where the plurality of branch chains are disposed in an encircling manner and connected between the movable platform and the fixed platform, and the end effector is on the movable platform; and an adsorption module which includes a plurality of fixed adsorption branch chains with the same structure to enable adsorption and fixation, movement, and cutting chips cleaning of the robot on a surface of a workpiece.

Technical Solution 2: the adsorption parallel machining robot of Technical Solution 1, where the end effector includes a spindle head and a machining device disposed at a lower part of the spindle head.

Technical Solution 3: the adsorption parallel machining robot of Technical Solution 2, where the processing device includes one or more of a polishing device, a grinding device, an additive manufacturing device, and a welding device.

Technical Solution 4: the adsorption parallel machining robot of any one of Technical Solutions 1 to 3, where the number of branch chains is three, and the three branch chains have the same structure, each of which includes a connecting rod, a sliding block, a U-shaped piece, and a lower connecting piece; the sliding block is sleeved on an outer side of the connecting rod, and relative rotational and sliding movements may occur between the two; the U-shaped piece is fixedly connected to a bottom of the connecting rod, the lower connecting piece is rotatably connected to the U-shaped piece, the sliding block is rotatably connected to the fixed platform, and the lower connecting piece is rotatably connected to the movable platform.

Technical Solution 5: the adsorption parallel machining robot of Technical Solution 4, where a first revolute joint is disposed between the sliding block and the fixed platform, a prismatic joint and a second revolute joint are disposed between the sliding block and the connecting rod, a third revolute joint is disposed between the U-shaped piece and the lower connecting piece, and a fourth revolute joint is disposed between the lower connecting piece and the movable platform.

Technical Solution 6: the adsorption parallel machining robot of Technical Solution 5, where the prismatic joint is an active driving kinematic joint; the third revolute joint and the fourth revolute joint are selected as Hooke hinges.

Technical Solution 7: the adsorption parallel machining robot of any one of Technical Solutions 1 to 3 and 5 to 6, where the number of branch chains is three, namely a first branch chain, a second branch chain and a third branch chain are included.

Technical Solution 8: the adsorption parallel machining robot of any one of Technical Solutions 1 to 3 and 5 to 6, where the adsorption module includes a plurality of fixed adsorption branch chains, which are connected to the fixed platform in the machining module by bolt fasteners.

Technical Solution 9: the adsorption parallel machining robot of Technical Solution 8, where the plurality of fixed adsorption branch chains are identical in structure, each of which includes a connecting bracket, a driving device, an omnidirectional wheel, and an adsorption device; the connecting bracket is fixedly connected with the fixed platform, the driving device and the adsorption device are fixedly mounted at a lower part of the connecting bracket, and an output shaft of the driving device is connected with the omnidirectional wheel.

Technical Solution 10: the adsorption parallel machining robot of Technical Solution 9, where the adsorption method of the adsorption device is electromagnetic adsorption.

Technical Solution 11: the adsorption parallel machining robot of Technical Solution 9, where a negative pressure adsorption locking device or a friction adsorption locking device is further fixedly mounted at the lower part of the connecting bracket.

Technical Solution 12: the adsorption parallel machining robot of Technical Solution 11, where the negative pressure adsorption locking device includes an electromagnetic plug, a rotating device, a vacuum suction cup, and a lifting device; the rotating device is fixedly mounted at the lower part of the connecting bracket and is connected with the lifting device, the lifting device is equipped with the vacuum suction cup at a lower end thereof, and the connecting bracket is further provided with an electromagnetic plug which restricts the rotation of the lifting device.

Technical Solution 13: the adsorption parallel machining robot of Technical Solution 11, where the friction adsorption locking device includes a lifting device, a rotating device, and a friction disc; the lifting device is fixedly mounted at the lower part of the connecting bracket and is connected with the rotating device, and the rotating device is equipped with a friction disc at a lower end thereof.

Technical Solution 14: the adsorption parallel machining robot of Technical Solution 13, where the friction disc is equipped with a high friction coefficient material on a lower surface thereof, and a soft brush on an upper surface thereof.

Technical Solution 15: the adsorption parallel machining robot of Technical Solution 8, where the number of fixed adsorption branch chains is three, namely a first fixed adsorption branch chain, a second fixed adsorption branch chain and a third fixed adsorption branch chain are included.

Technical Solution 16: the adsorption parallel machining robot of Technical Solution 11, where both the negative pressure adsorption locking device and the friction adsorption locking device have two working modes which are adsorption and fixation, and cutting chips cleaning.

Technical Solution 17: the adsorption parallel machining robot of any one of Technical Solutions 1 to 3 and 5 to 6, where the number of branch chains is five, namely a first branch chain, a second branch chain, a third branch chain, a fourth branch chain and a fifth branch chain are included.

Technical Solution 18: the adsorption parallel machining robot of Technical Solution 17, where the first branch chain includes: a first connecting rod, a first driving motor, a first Hooke hinge inner ring, a first Hooke hinge outer ring, a first U-shaped piece, a first lower connecting piece and kinematic joints; where the first connecting rod is provided with the first driving motor on an upper part thereof, and relative rotational and sliding movements may occur between the two; the first driving motor is rotatably provided with the first Hooke hinge inner ring, the first Hooke hinge outer ring is rotatably disposed on an outer side of the first Hooke hinge inner ring, and the first Hooke hinge outer ring is fixedly connected with the fixed platform; a bottom of the first connecting rod is fixedly connected with the first U-shaped piece, the first U-shaped piece is rotatably connected with the first lower connecting piece, and the first lower connecting piece is fixedly connected with the movable platform.

Technical Solution 19: the adsorption parallel machining robot of Technical Solution 17, where the second branch chain includes: a second connecting rod, a second driving motor, a second Hooke hinge inner ring, a second Hooke hinge outer ring, a second U-shaped piece, a second lower connecting piece and kinematic joints; where the second connecting rod is provided with the second driving motor on an upper part thereof, and relative rotational and sliding movements may occur between the second connecting rod and the second driving motor; the second driving motor is rotatably provided with the second Hooke hinge inner ring, the second Hooke hinge outer ring is rotatably disposed on an outer side of the second Hooke hinge inner ring, and the second Hooke hinge outer ring is fixedly connected with the fixed platform; a bottom of the second connecting rod is fixedly connected with the second U-shaped piece, the second U-shaped piece is rotatably connected with the second lower connecting piece, and the second lower connecting piece is rotatably connected with the movable platform.

Technical Solution 20: the adsorption parallel machining robot of Technical Solution 17, where the second branch chain, the third branch chain, the fourth branch chain, and the fifth branch chain have the same structure.

Beneficial effects: in the present application, fast switching between fixed adsorption and flexible movement can be achieved; deceleration motor drives the omnidirectional wheel to move the robot to the position to be processed on the workpiece, and the adsorption locking device is used to firmly fix the robot onto the surface of the workpiece at the position to be processed, such that the workpiece may be drilled and milled or subjected to other processing operations through the multi-degree-of-freedom machining module carried by the robot, and after the processing is completed, the cleaning function of the adsorption lock device is used to clean the remaining cutting chips on the robot. The robot can be moved by the mobile device in the adsorption module, may reach the position to be processed by itself, and may return or move to the next processing position by itself after the processing is completed, thereby saving the steps such as installing adsorption machining equipment and improving production efficiency. The adsorption locking device of the robot ensures good accuracy during processing, and the cleaning function of the device ensures the subsequent processing quality of the robot. The cleaning and locking function of the adsorption locking device helps to improve the processing quality of the machining module, and the processing efficiency of the robot is increased through the mobile device.

| Reference Numerals: | |
| --- | --- |
| 11 fixed platform | 12 first branch chain |
| 13 second branch chain | 14 third branch chain |
| 17 fourth branch chain | 18 fifth branch chain |
| 15 movable platform | 16 end effector |
| 101 connecting rod | 102 sliding block |
| 103 U-shaped piece | 104 lower connecting piece |
| 21 first fixed adsorption branch chain | 22 second fixed adsorption branch chain |
| 23 third fixed adsorption branch chain | 201 connecting bracket |
| 202 driving device | 203 omnidirectional wheel |
| 204 adsorption device | |
| 205 negative pressure adsorption locking device | |
| 2051 electromagnetic plug | 2052 rotating device |
| 2053 vacuum suction cup | 2054 lifting device |
| 121 first connecting rod | 122 first driving motor |
| 123 first Hooke hinge inner ring | 124 first Hooke hinge outer ring |
| 125 first U-shaped piece | 126 first lower connecting piece |
| 131 second connecting rod | 132 second driving motor |
| 133 second Hooke hinge inner ring | 134 second Hooke hinge outer ring |
| 135 second U-shaped piece | 136 second lower connecting piece |

DETAILED DESCRIPTION

In order to make the above-mentioned objects, features and advantages of the present application more obvious and understandable, specific embodiments of the present application will be described in detail below in conjunction with accompanying drawings.

Embodiment 1

As shown in FIGS. 1-9, the adsorption parallel machining robot in the present application includes a machining module and an adsorption module, where the machining module is configured to drill and mill large structural parts, and the adsorption module is configured to drive the machining module to move, adsorb and fix, and clean up cutting chips.

Figure 1:
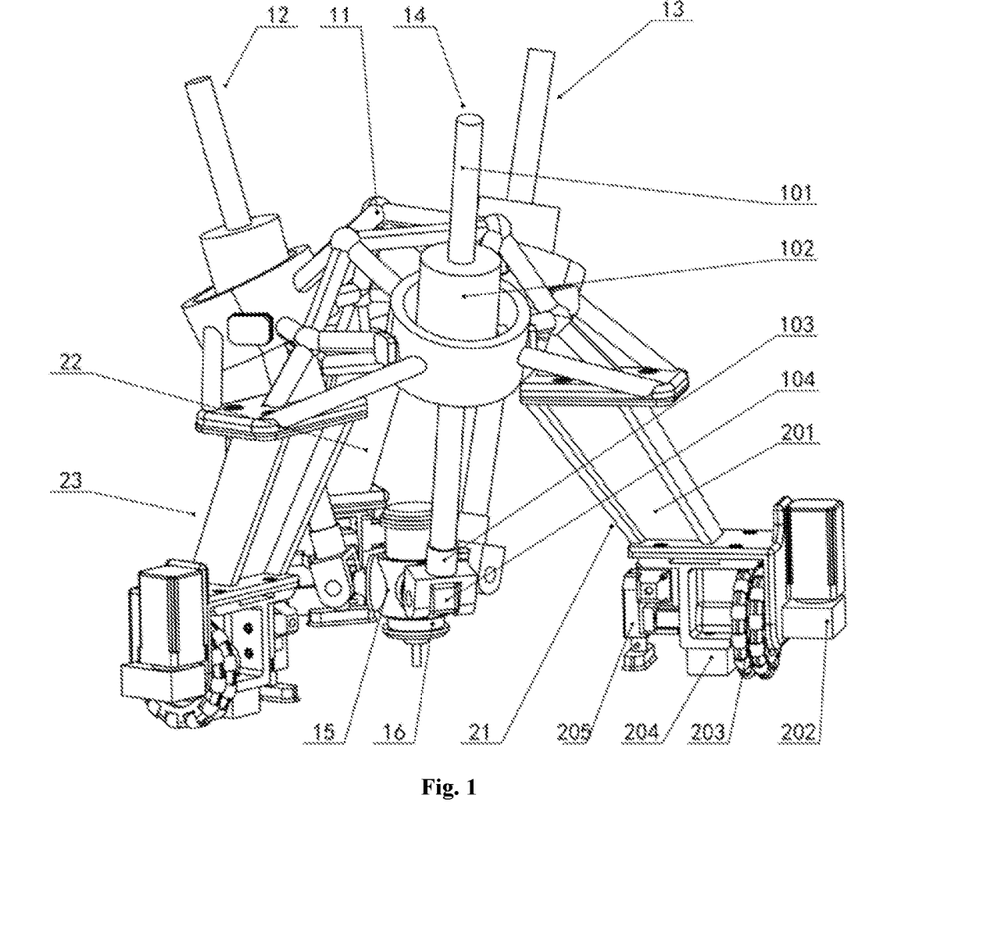
FIG. 1 is a schematic diagram of the overall structure of a three-degree-of-freedom robot according to Embodiment 1.
Figure 3:
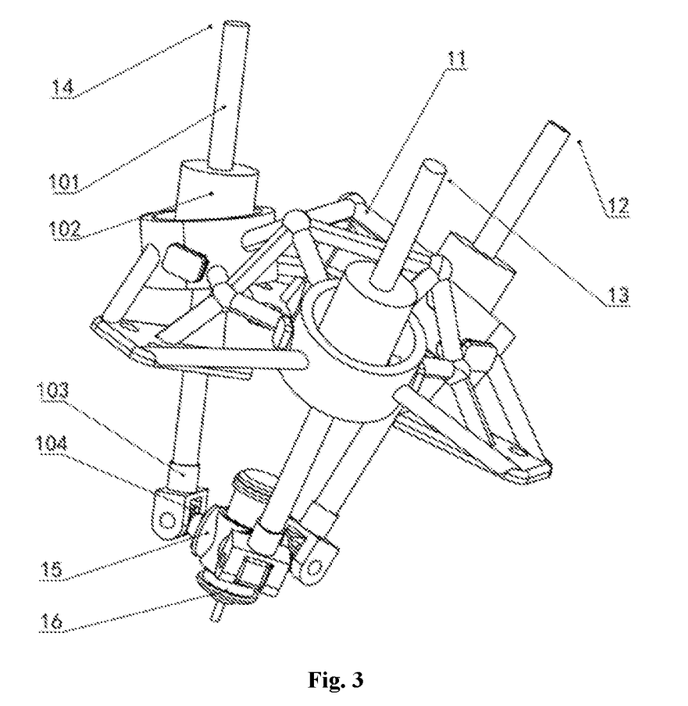
FIG. 3 is a schematic diagram of the structure of a machining module according to Embodiment 1.

The machining module includes a fixed platform 11, a plurality of branch chains, a movable platform 15, and an end effector 16. The plurality of branch chains are evenly disposed in an encircling manner and connected between the movable platform 15 and the fixed platform 11, and the end effector 16 is mounted on the movable platform 15.

The plurality of branch chains are respectively connected with the fixed platform 11 and the movable platform 15 to form a spatial parallel closed-loop mechanism which drives the movable platform 15 to move through a plurality of input motions, so as to drive the end effector 16 to move.

Wherein the plurality of branch chains are identical in structure, each of which includes a connecting rod 101, a sliding block 102, a U-shaped piece 103, and a lower connecting piece 104. The sliding block 102 is sleeved on an outer side of the connecting rod 101, and relative rotational and sliding movements may occur between the sliding block 102 and the connecting rod 101; the U-shaped piece 103 is fixedly connected to a bottom of the connecting rod 101, the lower connecting piece 104 is rotatably connected to the U-shaped piece 103, the sliding block 102 is rotatably connected to the fixed platform 11, and the lower connecting piece 104 is rotatably connected to the movable platform 15.

Wherein, a first revolute joint is disposed between the sliding block 102 and the fixed platform 11, a prismatic joint and a second revolute joint are disposed between the sliding block 102 and the connecting rod 101, a third revolute joint is disposed between the U-shaped piece and the lower connecting piece, and a fourth revolute joint is disposed between the lower connecting piece 104 and the movable platform 15.

Further, the prismatic joint between the sliding block 102 and the connecting rod 101 is an active driving kinematic joint; the third revolute joint and the fourth revolute joint connected between the U-shaped piece 103 and the lower connecting piece 104 and between the lower connecting piece 104 and the movable platform 15 may be selected as Hooke hinges; the branch chain is a spatial five-degree-of-freedom branch chain.

Figure 2:
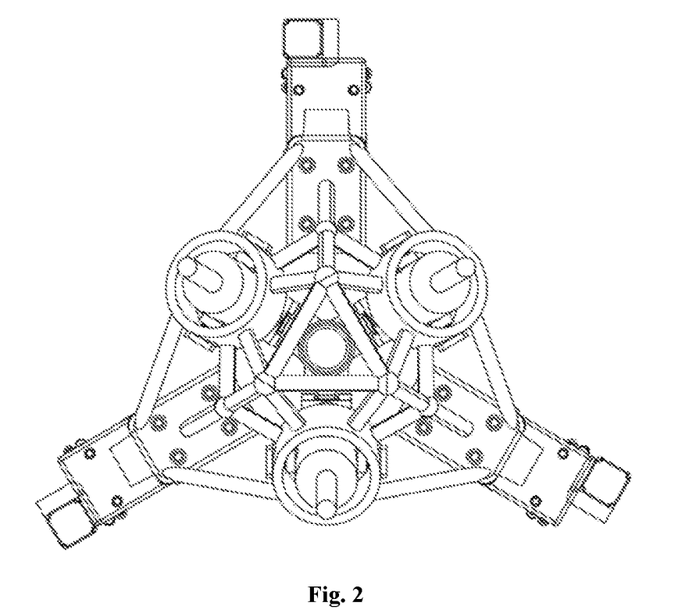
FIG. 2 is a top view of a three-degree-of-freedom robot according to Embodiment 1.

Further, the number of branch chains is preferably three, namely the first branch chain 12, the second branch chain 13 and the third branch chain 14 are included. The movable platform 15 is driven to move through three input motions to achieve two rotational degrees of freedom and one translational degree of freedom.

Restricted by the serial structure, the serial robot arm has poor processing performance, while the parallel mechanism has the advantages of compact structure, high rigidity, and easy to achieve high-speed movement, and thus is more suitable for processing. Compared with the parallel mechanism with higher degrees of freedom, the three-degree-of-freedom parallel mechanism has the degrees of freedom required for common processing, while its accuracy, rigidity and other properties are more easily guaranteed, in addition, the manufacturing cost and manufacturing difficulty are significantly reduced. Definitely, it is also feasible to provide higher degrees of freedom according to actual processing needs, for example, four degrees of freedom, five degrees of freedom, etc.

The adsorption module includes a plurality of fixed adsorption branch chains which are connected to the fixed platform 11 in the machining module by bolt fasteners.

Figure 4:
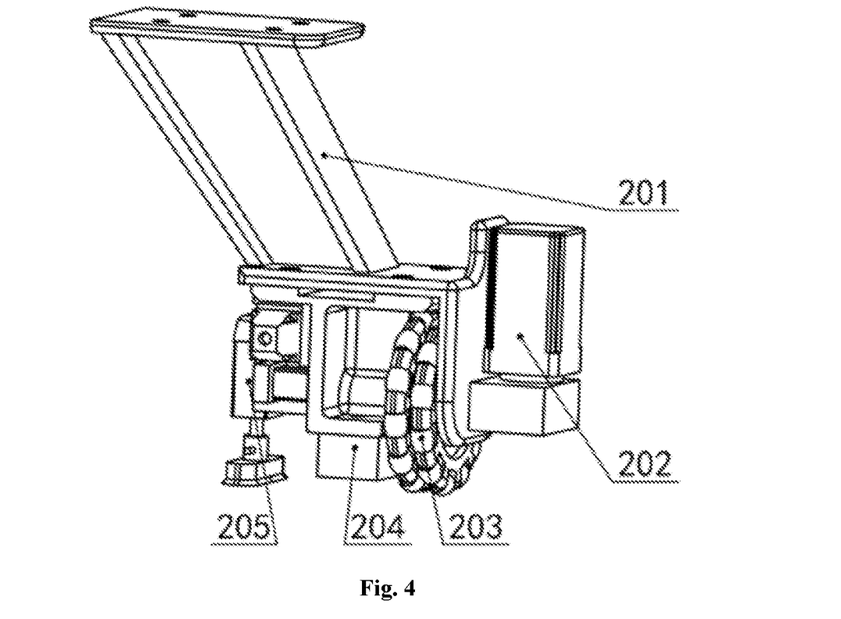
FIG. 4 is a schematic diagram of the structure of a fixed adsorption branch chain according to Embodiment 1.

The plurality of fixed adsorption branch chains are identical in structure, each of which includes a connecting bracket 201, a driving device 202, an omnidirectional wheel 203, an adsorption device 204, and a negative pressure adsorption locking device 205. The connecting bracket 201 is fixedly connected to the fixed platform 11, the driving device 202, the adsorption device 204 and the negative pressure adsorption locking device 205 are all fixedly mounted at the lower part of the connecting bracket 201, and the output shaft of the driving device 202 is connected to the omnidirectional wheel 203.

Further, an adsorption method of the adsorption device 204 is electromagnetic adsorption.

Figure 5:
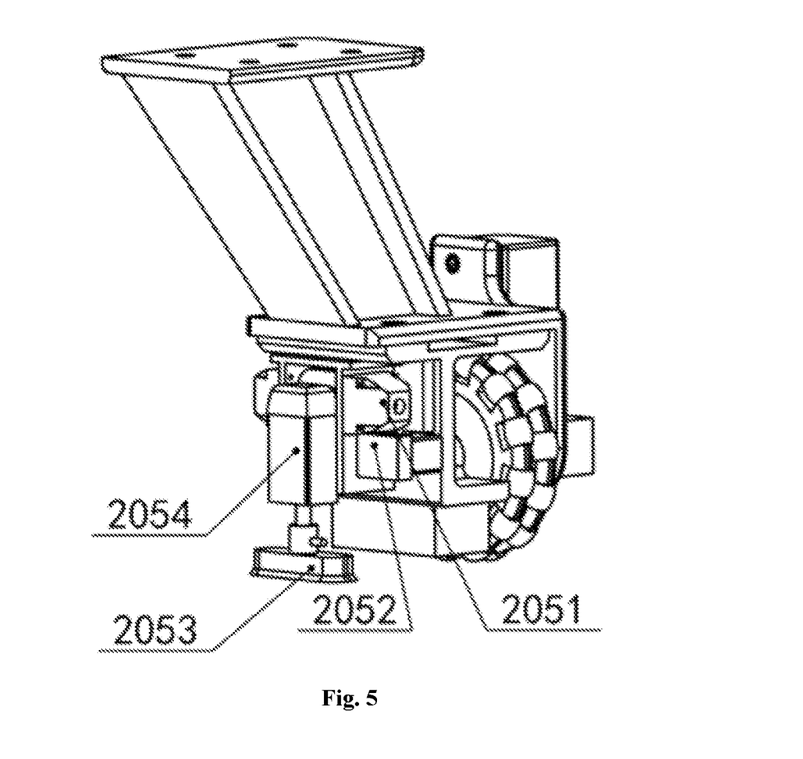
FIG. 5 is a schematic diagram of the structure of a negative pressure adsorption locking device according to Embodiment 1.

The negative pressure adsorption locking device 205 includes an electromagnetic plug 2051, a rotating device 2052, a vacuum suction cup 2053, and a lifting device 2054, where the rotating device 2052 is fixedly mounted at a lower part of the connecting bracket 201, the lifting device 2054 is connected to the rotating device 2052, the vacuum suction cup 2053 is mounted at a lower end of the lifting device 2054, the connecting bracket 201 is further provided with an electromagnetic plug 2051 which restricts the rotation of the lifting device 2054.

The driving device 202 supplies power to the omnidirectional wheel 203 through a self-locking deceleration motor within the structure. The adsorption method of the adsorption device 204 is electromagnetic adsorption, the adsorption force may be controlled by controlling the magnitude of the energized current, and the negative pressure adsorption locking device 205 fixes the robot at the position to be processed by the vacuum suction cup 2053 to prevent the robot from small skidding during processing. The negative pressure adsorption locking device 205 is equipped with the rotating device 2052, and the rotating device 2052 is used to drive the vacuum suction cup 2053 to rotate. By changing the air path connected to the vacuum suction cup, the compressed air is ejected to clean the cutting chips remaining on the adsorption device and the spindle.

Further, the number of fixed adsorption branch chains is preferably three, namely a first fixed adsorption branch chain 21, a second fixed adsorption branch chain 22 and a third fixed adsorption branch chain 23 are included.

Figure 6:
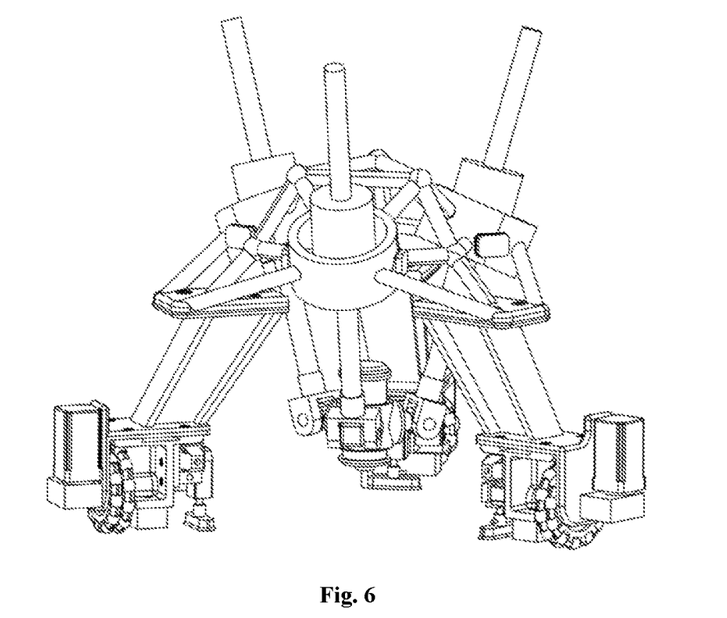
FIG. 6 is a schematic diagram showing an adsorption state of a three-degree-of-freedom robot according to Embodiment 1.

By means of the above settings, the end effector 16 in the machining module may drill and mill large structural parts, and the length of the connecting rod 101 between the movable platform 15 and the fixed platform 11 is variable by the active driving kinematic joint on the driving branch chain, such that the position and posture of the movable platform 15 is adjusted, and the position and posture of the end effector 16 is adjusted to adapt to different processing conditions. The robot is adsorbed on the surface of the workpiece by the adsorption device 204 on the adsorption module, and the adsorption force between the adsorption module and the workpiece is variable by changing the strength of the current flowing into the adsorption device 204. When the robot is adsorbing and moving on the surface of the workpiece, the adsorption force is reduced by reducing the input current, and the driving device 202 drives the omnidirectional wheel 203 to make the robot move. When the robot reaches the position to be processed on the workpiece, the robot stops moving, the deceleration motor in the driving device 202 is in a self-locking state, and the omnidirectional wheel 203 stops moving. At this time, the adsorption force is increased by increasing the current to provide sufficient adsorption force for processing, the working state is shown in FIG. 6. When the robot moves to the position to be processed on the workpiece and performs adsorption, the electromagnetic plug 2051 in each fixed adsorption branch chain is energized to fix the lifting device 2054 to prevent it from rotating. The suction cup 2053 is lowered to the position where the surface of the suction cup 2053 is in close contact with the surface of the workpiece through the lifting device 2054, and the working position of the reversing valve in the air pressure circuit is changed, so that the suction cup communicates to the vacuum pressure circuit, and a negative pressure is formed in the suction cup 2053, thereby making the suction cup 2053 adsorbed on the surface of the workpiece, enhancing the adsorption capacity of the robot and improving the stability of the robot during processing.

Figure 7:
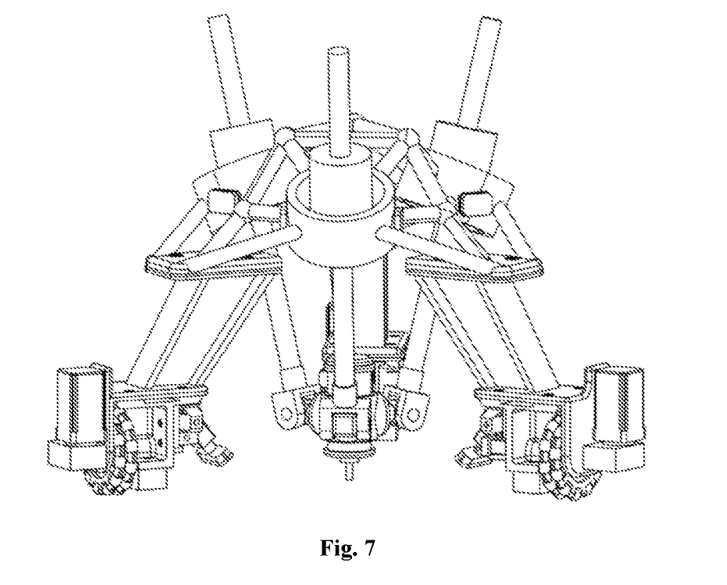
FIG. 7 is a schematic diagram showing a cleaning state of a spindle of a three-degree-of-freedom robot according to Embodiment 1.

After the processing is completed, the adsorption parallel machining robot firstly cleans the cutting chips on the spindle tool, that is, the spindle is lowered to a suitable height through the movement of the branch chain, the electromagnetic plug 2051 in each fixed adsorption branch chain is powered off, the rotation restriction of the lifting device 2054 is released, and the rotating device 2052 on the fixed adsorption branch chain drives the lifting device 2054 and the suction cup 2053 to rotate. The position of the suction cup 2053 is adjusted by the lifting device 2054 to ensure that the suction cup 2053 is in the proper cleaning position and posture, and then the working position of the reversing valve in the air pressure circuit is changed, so that all the suction cups communicates to the compressed air blowing circuit, and compressed air is ejected from three suction cups to clean the cutting chips on the spindle tool.

Figure 8:
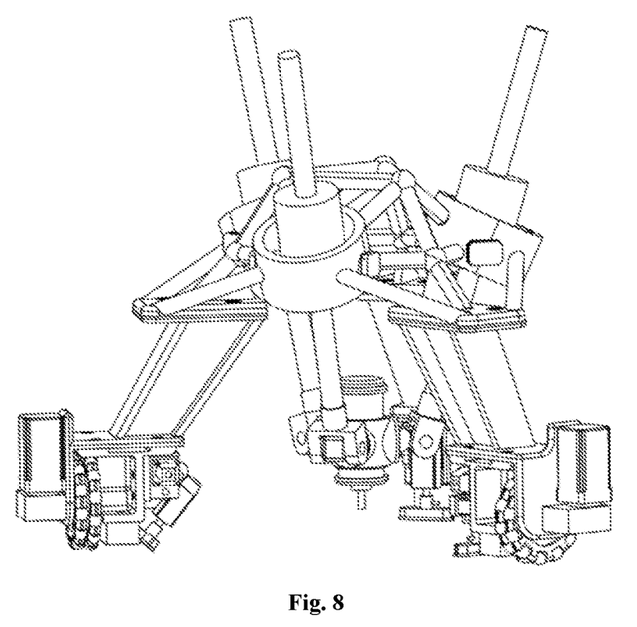
FIG. 8 is a schematic diagram showing a cleaning state of an electromagnetic adsorption device of a three-degree-of-freedom robot according to Embodiment 1.
Figure 9:
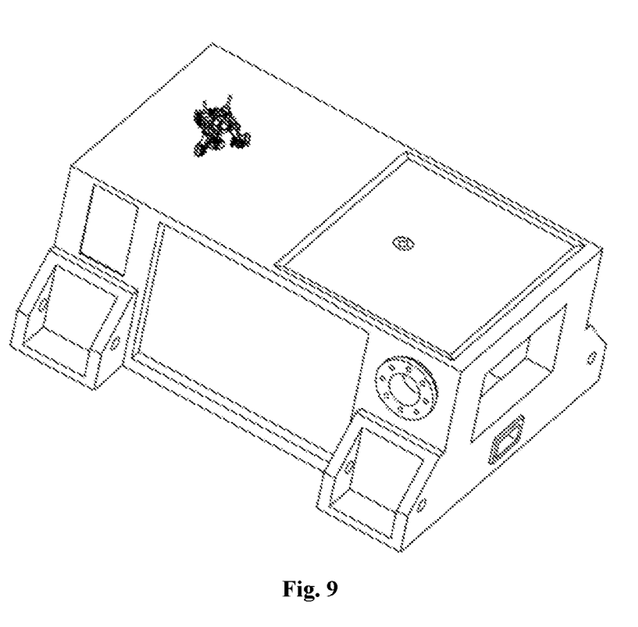
FIG. 9 is a schematic diagram of a three-degree-of-freedom robot processing large structural parts according to Embodiment 1.
Figure 10:
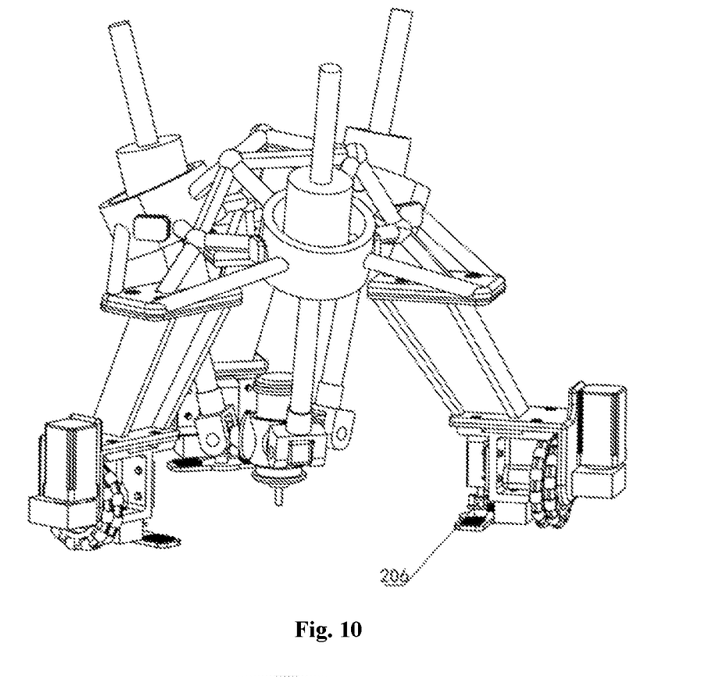
FIG. 10 is a schematic diagram of the overall structure of a three-degree-of-freedom robot according to Embodiment 2.

Subsequently, the electromagnetic adsorption device is cleaned, and the robot cleans the electromagnetic adsorption devices separately. When cleaning a certain electromagnetic adsorption device, the electromagnetic adsorption device is powered off to ensure complete cleaning, and the input current of the other electromagnetic adsorption devices is increased to ensure that the robot can be stably adsorbed on the surface of the workpiece during the cleaning process. Subsequently, the rotating device 2052 in the fixed adsorption branch chain where the de-energized electromagnetic adsorption device is located drives the lifting device 2054 and the suction cup 2053 to rotate. The position of the suction cup 2053 is adjusted by the lifting device 2054 so that the suction cup is in the proper cleaning position and posture, and then the working position of the reversing valve in the air pressure circuit is changed, so that the suction cup communicates to the compressed air blowing circuit to clean the electromagnetic adsorption device. During the entire process of cleaning the de-energized electromagnetic adsorption device, the vacuum adsorption locking device in the fixed adsorption branch chain where the energized electromagnetic adsorption device is located is always in an inoperative state. In the same way, the remaining two electromagnetic adsorption devices are cleaned by being powered off in turn, thereby completing the cleaning of the electromagnetic adsorption devices.

The above working methods are illustrated as follows, for example, the electromagnetic adsorption device in the fixed adsorption branch chain 21 is powered off and does not work, and the working current of the fixed adsorption branch chains 22 and 23 is increased to enhance the adsorption force. At this time, the rotating device 2052 on the fixed adsorption branch chain 21 drives the lifting device 2054 and the suction cup 2053 to rotate, and the lifting device 2054 adjusts the position of the suction cup 2053 so that the suction cup is in a proper cleaning position. The working position of the reversing valve in the air pressure circuit is changed, so that the suction cup in the fixed adsorption branch chain 21 communicates to the compressed air blowing circuit, and then the electromagnetic adsorption device on the fixed adsorption branch chain 21 is cleaned. In the entire cleaning process of the fixed adsorption branch chain 21, the vacuum adsorption locking devices in the fixed adsorption branch chains 22 and 23 are always in an inoperative state. After the cleaning is completed, the fixed adsorption branch chains 21 and 23 are energized, 22 is powered off, and then the electromagnetic adsorption device on the fixed adsorption branch chain 22 is cleaned, and so on, finally completing the cleaning of all electromagnetic adsorption devices, whose working state is shown in FIG. 8.

When the robot needs to move, the suction cup 2053 is raised to a position far away from the surface of the workpiece through the lifting device 2054 to enhance the passing ability of the robot.

Embodiment 2

As shown in FIGS. 10-13, the difference between Embodiment 2 and Embodiment 1 lies in that: in Embodiment 2, the adsorption locking device in each fixed adsorption branch chain in the adsorption module is locked by the principle of increasing friction, that is, the locking device is a friction adsorption locking device 206.

Figure 11:
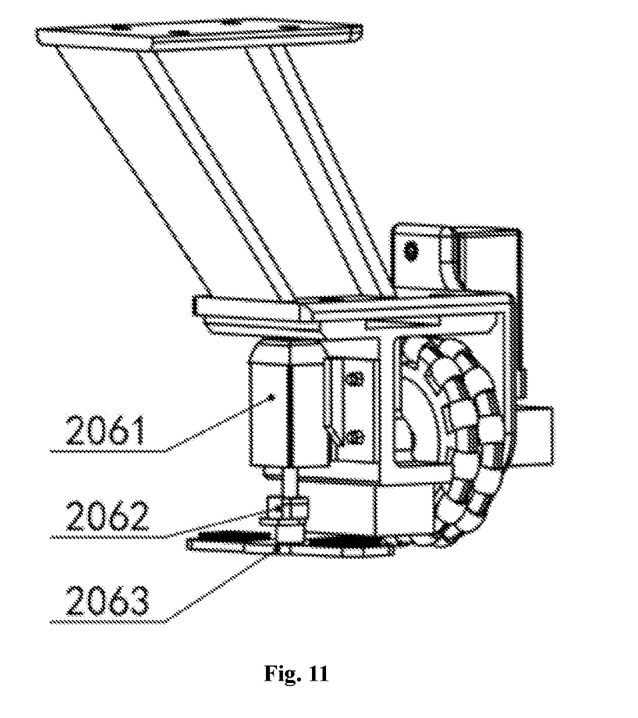
FIG. 11 is a schematic diagram of the structure of a fixed adsorption branch chain according to Embodiment 2.

As shown in FIG. 11, the friction adsorption locking device 206 includes: a lifting device 2061, a rotating device 2062, a friction disc 2063, the lifting device 2061 is fixedly mounted at a lower part of the connecting bracket 201, the lifting device 2061 is connected with the rotating device 2062, and the rotating device 2062 is equipped with a friction disc 2063 at a lower end thereof.

The friction disc 2063 is equipped with a high friction coefficient material on a lower surface thereof, and a soft brush on an upper surface thereof.

The friction adsorption locking device 206 has two working modes which are enhancing adsorption force and cleaning cutting chips.

Figure 12:
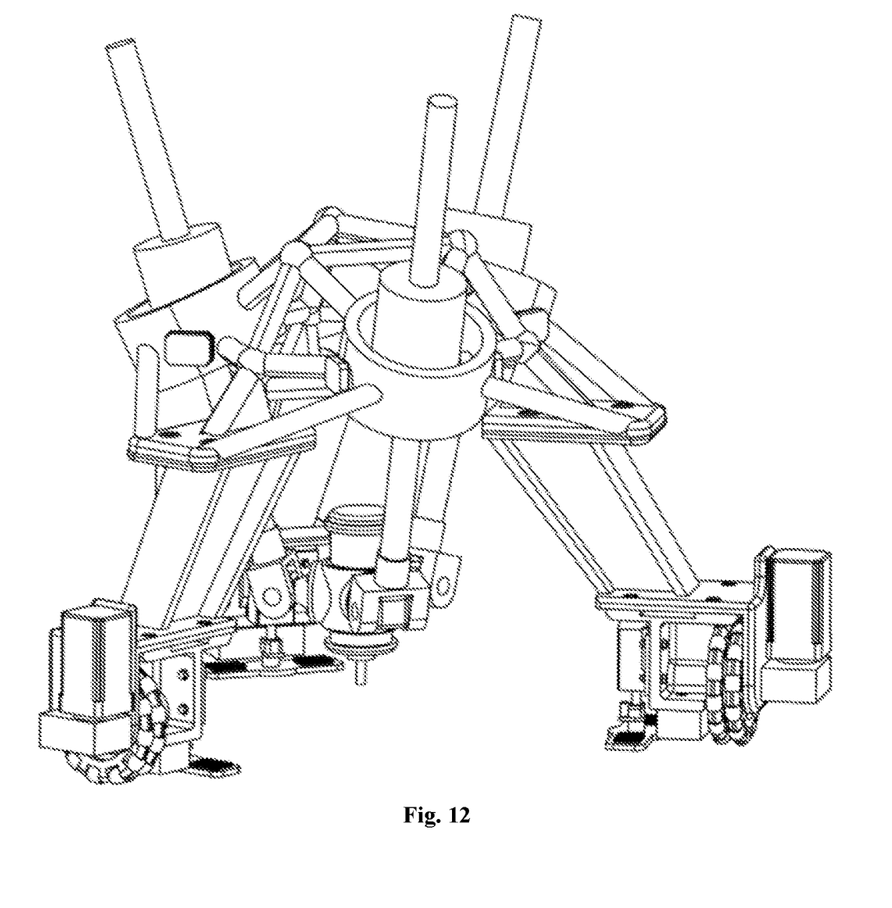
FIG. 12 is a schematic diagram showing an adsorption state of a three-degree-of-freedom robot according to Embodiment 2.

After the robot moves to the position to be processed on the workpiece and performs adsorption, the friction disc 2063 is lowered to a position where the lower surface of the friction disc 2063 is in close contact with the surface of the workpiece through the lifting device 2061, thereby increasing the friction coefficient between the adsorption module and the surface of the workpiece.

Compared with Embodiment 1, the tangential maximum static friction force is increased in Embodiment 2 under the premise of applying the same adsorption force, which improves the robot's resistance to small skidding during processing. The working state of the robot at this time is shown in FIG. 12.

Figure 13:
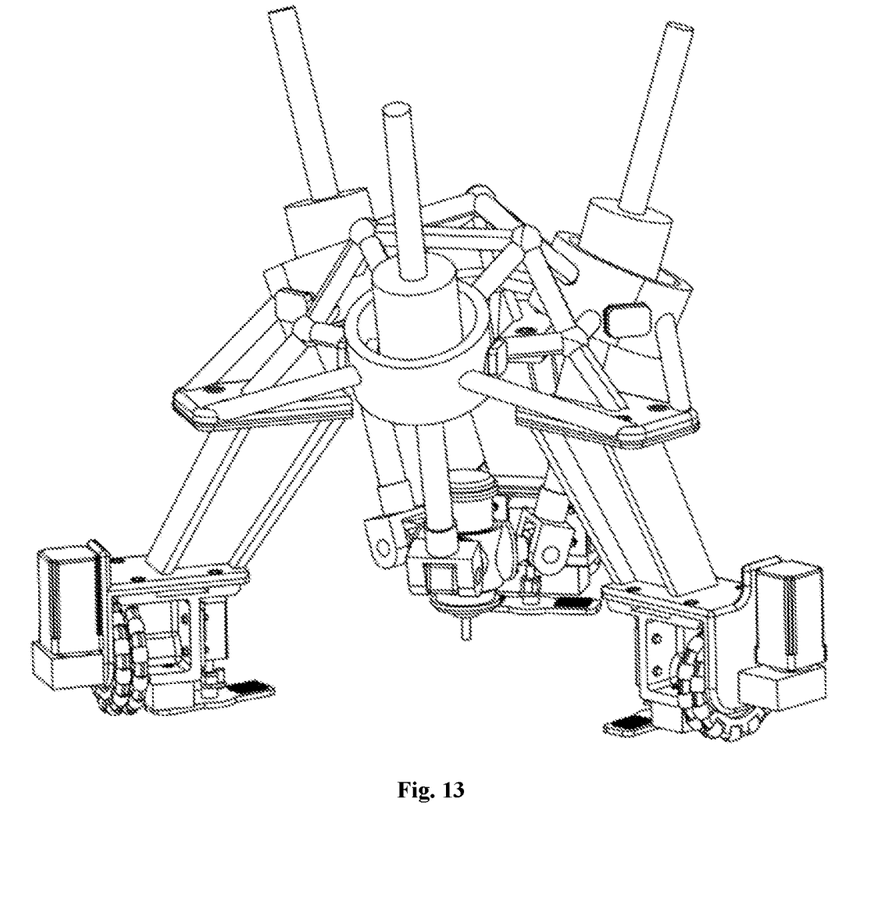
FIG. 13 is a schematic diagram showing a cleaning state of a three-degree-of-freedom robot according to Embodiment 2.

After the processing is completed, the robot cleans the remaining cutting chips on the electromagnetic adsorption device. The robot cleans the plurality of electromagnetic adsorption devices in the plurality of fixed adsorption branch chains respectively. When cleaning a certain electromagnetic adsorption device, the electromagnetic adsorption device is powered off, and the input current of the other electromagnetic adsorption devices is increased to enhance the adsorption force, so as to ensure that the robot can be stably adsorbed on the surface of the workpiece during the cleaning process. Subsequently, the lifting device 2061 in the fixed adsorption branch chain where the de-energized electromagnetic adsorption device is located moves the friction disc 2063 to a suitable position where the upper surface of the friction disc 2063 is in contact with the lower surface of the electromagnetic adsorption device, the rotating device 2062 drives the friction disc 2063 to rotate, and the cutting chips are cleaned up by the soft brush on the upper surface of the friction disc. In the entire process of cleaning the de-energized fixed branch chain, the friction adsorption locking device in the energized fixed adsorption branch chain is always in a working state of enhancing the adsorption capacity. In the same way, the remaining electromagnetic adsorption devices are cleaned by being powered off in turn, thereby completing the cleaning of all the electromagnetic adsorption devices.

The above working methods are illustrated as follows, for example, the electromagnetic adsorption device in the fixed adsorption branch chain 21 does not work, and the working current of the fixed adsorption branch chains 22 and 23 is increased to enhance the adsorption force. At this time, the lifting device 2061 on the fixed adsorption branch chain 21 moves the friction disc 2063 to a suitable position, so as to ensure that the soft brush on the upper surface of the friction disc 2063 may be in proper contact with the lower surface of the electromagnetic adsorption device. Then the rotating device 2062 drives the friction disc 2063 to rotate, and the electromagnetic adsorption device is cleaned by the soft brush on the upper surface of the friction disc 2063. In the entire cleaning process of the fixed adsorption branch chain 21, the friction adsorption locking devices in the fixed adsorption branch chains 22 and 23 are always in a working state of enhancing the adsorption capacity. After the cleaning is completed, the fixed adsorption branch chains 21 and 23 are energized, 22 is powered off, and then the electromagnetic adsorption device on the fixed adsorption branch chain 22 is cleaned, and so on, finally completing the cleaning of all electromagnetic adsorption devices, whose working state is shown in FIG. 13.

When the robot needs to move, the friction disc 2063 is raised to a position far away from the surface of the workpiece through the lifting device 2061 to enhance the passing ability of the robot.

Embodiment 3

As shown in FIGS. 14-17, the difference between Embodiment 3 and Embodiment 1 or Embodiment 2 lies in that: in Embodiment 3, a five-degree-of-freedom parallel robot with more degrees of freedom is adopted.

Figure 14:
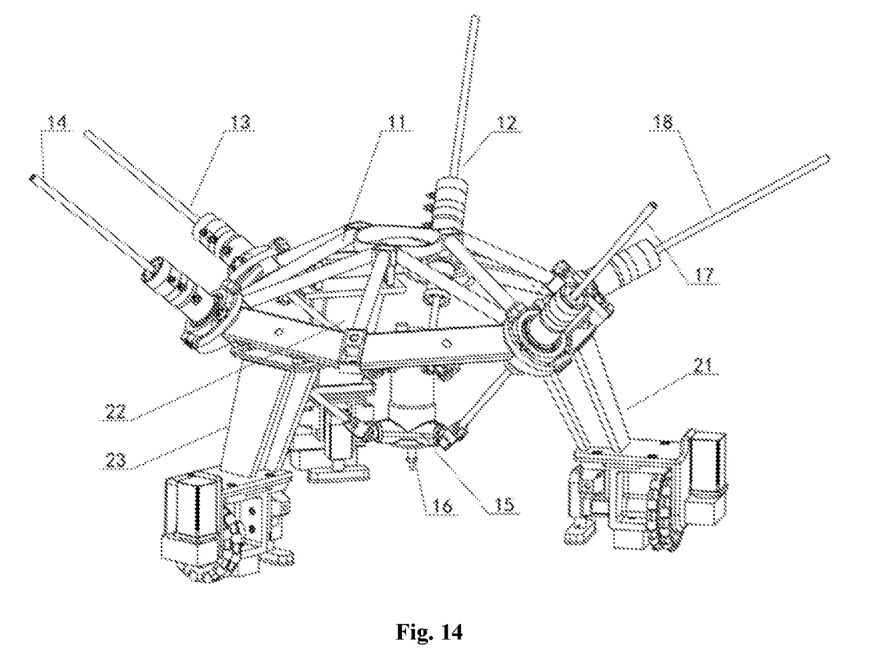
FIG. 14 is a schematic diagram of the overall structure of a five-degree-of-freedom robot according to Embodiment 3.
Figure 15:
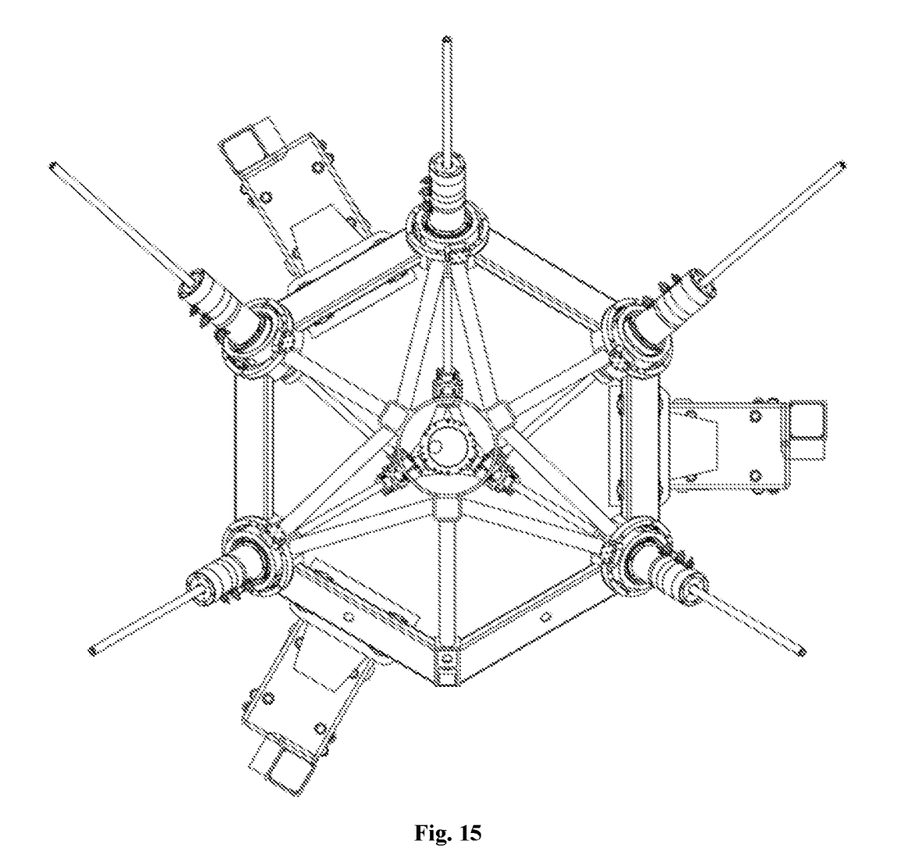
FIG. 15 is a top view of a five-degree-of-freedom robot according to Embodiment 3.
Figure 16:
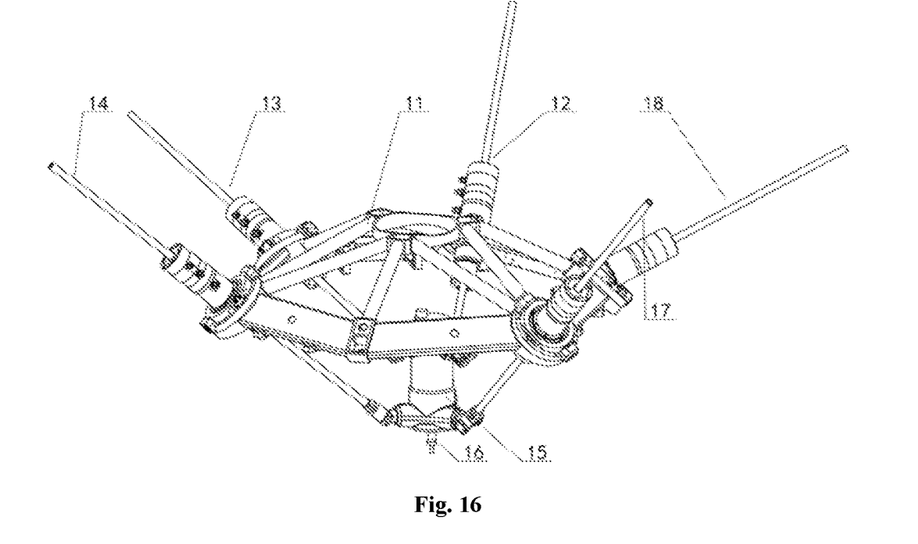
FIG. 16 is a schematic diagram of the structure of a machining module according to Embodiment 3.
Figure 17:
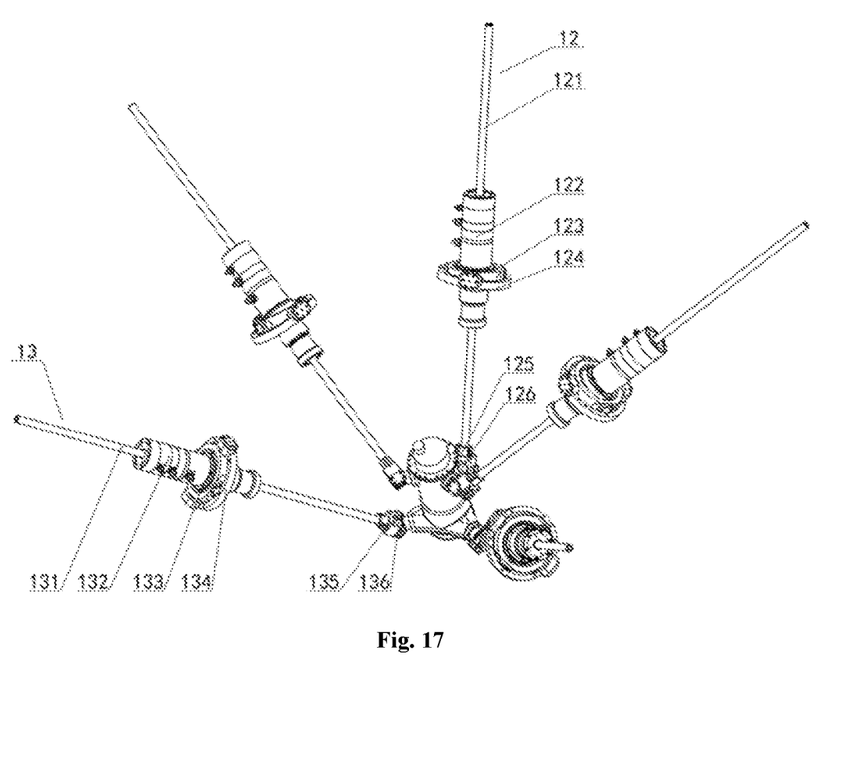
FIG. 17 is a schematic diagram of the structure of five branch chains according to Embodiment 3.

The five-degree-of-freedom parallel robot includes a fixed platform 11, a first branch chain 12, a second branch chain 13, a third branch chain 14, a fourth branch chain 17, a fifth branch chain 18, a movable platform 15, and an end effector 16; the first to fifth branch chains are connected between the fixed platform 11 and the movable platform 15 to form a spatial parallel closed-loop mechanism, and each branch chain contains an active driving kinematic joint. The spatial parallel closed-loop mechanism drives the movable platform 15 to move through five input motions, so as to achieve three rotational degrees of freedom and two translational degrees of freedom. The movable platform 15 is used for fixed mounting of the end effector 16.

Wherein the first branch chain 12 includes a first connecting rod 121, a first driving motor 122, a first Hooke hinge inner ring 123, a first Hooke hinge outer ring 124, a first U-shaped piece 125, a first lower connecting piece 126 and kinematic joints, where the first connecting rod 121 is provided with the first driving motor 122 on an upper part thereof, and relative rotational and sliding movements may occur between the two; the first driving motor 122 is rotatably provided with the first Hooke hinge inner ring 123, the first Hooke hinge outer ring 124 is rotatably disposed on an outer side of the first Hooke hinge inner ring 123, and the first Hooke hinge outer ring 124 is fixedly connected with the fixed platform 11; a bottom of the first connecting rod 121 is fixedly connected with the first U-shaped piece 125, the first U-shaped piece 125 is rotatably connected with the first lower connecting piece 126, and the first lower connecting piece 126 is fixedly connected with the movable platform 15.

There are five kinematic joints, namely a first revolute joint connected between the first Hooke hinge inner ring 123 and the first Hooke hinge outer ring 124, a second revolute joint connected between the first Hooke hinge inner ring 123 and the first drive motor 122, a first prismatic joint connected between the first driving motor 122 and the first connecting rod 121, a third revolute joint connected between the first driving motor 122 and the first connecting rod 121, and a fourth revolute joint connected between the first U-shaped piece 125 and the first lower connecting piece 126.

Wherein the first prismatic joint connected between the first driving motor 122 and the first connecting rod 121 is driven; the first revolute joint and the second revolute joint may be replaced by a Hooke hinge; the first branch chain 12 is a spatial five-degree-of-freedom branch chain.

The second branch chain 13 includes: a second connecting rod 131, a second driving motor 132, a second Hooke hinge inner ring 133, a second Hooke hinge outer ring 134, a second U-shaped piece 135, a second lower connecting piece 136 and kinematic joints; where the second connecting rod 131 is provided with the second driving motor 132 on an upper part thereof, and relative rotational and sliding movements may occur between the two; the second driving motor 132 is rotatably provided with the second Hooke hinge inner ring 133, the second Hooke hinge outer ring 134 is rotatably disposed on an outer side of the second Hooke hinge inner ring 133, and the second Hooke hinge outer ring 134 is fixedly connected with the fixed platform 11; a bottom of the second connecting rod 131 is fixedly connected with the second U-shaped piece 135, the second U-shaped piece 135 is rotatably connected with the second lower connecting piece 136, and the second lower connecting piece 136 is rotatably connected with the movable platform 15.

There are six kinematic joints in total, namely a fifth revolute joint connected between the second Hooke hinge inner ring 133 and the second Hooke hinge outer ring 134, a sixth revolute joint connected between the second Hooke hinge inner ring 133 and the second drive motor 132, a second prismatic joint connected between the second driving motor 132 and the second connecting rod 131, a seventh revolute joint connected between the second driving motor 132 and the second connecting rod 131, an eighth revolute joint connected between the second U-shaped piece 135 and the second lower connecting piece 136, and a ninth revolute joint connected between the second lower connecting piece 136 and the movable platform 15.

Wherein the second prismatic joint connected between the second driving motor 132 and the second connecting rod 131 is driven; the fifth revolute joint and the sixth revolute joint may be replaced by a Hooke hinge; the eighth revolute joint and the ninth revolute joint may be replaced by a Hooke hinge; the second branch chain is a spatial six-degree-of-freedom branch chain.

The second branch chain, the third branch chain, the fourth branch chain, and the fifth branch chain have the same structure.

The embodiments are intended to exemplify the present application, but not to limit the present application. Any person skilled in the art may modify the embodiments without departing from the spirit and scope of the present application. Therefore, the protection scope of the present application should be as set forth in the claims of the present application.

The invention claimed is:

1. An adsorption parallel machining robot comprising:
a machining module;
an adsorption module;
wherein the machining module comprises a fixed platform, a movable platform, a plurality of branch chains and an end effector, the plurality of branch chains are disposed in an encircling manner and connected between the movable platform and the fixed platform, and the end effector is mounted on the movable platform; and
wherein the adsorption module comprises a plurality of fixed adsorption branch chains to enable adsorption and fixation, movement, and cutting chips cleaning of the adsorption parallel machining robot on a surface of a workpiece, wherein the plurality of fixed adsorption branch chains are connected to the fixed platform of the machining module by bolt fasteners, wherein each fixed adsorption branch chain of the plurality of fixed adsorption branch chains comprises a connecting bracket, a driving device, an omnidirectional wheel, and an adsorption device in which the connecting bracket is fixedly connected with the fixed platform, wherein the driving device and the adsorption device are fixedly mounted at a lower part of the connecting bracket, and wherein an output shaft of the driving device is connected with the omnidirectional wheel.

2. The adsorption parallel machining robot of claim 1, wherein the end effector comprises a spindle head and a machining device disposed at a lower part of the spindle head.

3. The adsorption parallel machining robot of claim 2, wherein the machining device comprises one or more of a polishing device, a grinding device, an additive manufacturing device, and a welding device.

4. The adsorption parallel machining robot of claim 1, wherein an adsorption method of the adsorption device is electromagnetic adsorption.

5. The adsorption parallel machining robot of claim 1, wherein a friction adsorption locking device is further fixedly mounted at the lower part of the connecting bracket.

6. The adsorption parallel machining robot of claim 5, wherein the friction adsorption locking device comprises a lifting device, a rotating device, and a friction disc; the lifting device is fixedly mounted at the lower part of the connecting bracket and is connected with the rotating device, and the rotating device is equipped with a friction disc at a lower end thereof; the friction disc is equipped with a high friction coefficient material on a lower surface thereof, and a soft brush on an upper surface thereof.

7. The adsorption parallel machining robot of claim 2, wherein an adsorption method of the adsorption device is electromagnetic adsorption.

8. The adsorption parallel machining robot of claim 3, wherein an adsorption method of the adsorption device is electromagnetic adsorption.

9. The adsorption parallel machining robot of claim 2, wherein a friction adsorption locking device is further fixedly mounted at the lower part of the connecting bracket.

10. The adsorption parallel machining robot of claim 3, wherein a friction adsorption locking device is further fixedly mounted at the lower part of the connecting bracket.

11. An adsorption parallel machining robot comprising:
  a machining module means for drilling and milling structural parts, wherein the machining module includes a fixed platform, a movable platform,
  a plurality of branch chains and an end effector, the plurality of branch chains are disposed in an encircling manner and connected between the movable platform and the fixed platform, and the end effector is mounted on the movable platform; and
  an adsorption module including a plurality of fixed adsorption branch chain means for enabling adsorption and fixation, movement, and cleaning of cutting chips of the adsorption parallel machining robot on a surface of a workpiece, wherein the plurality of fixed adsorption branch chain means are connected to the fixed platform of the machining module by bolt fasteners, wherein each fixed adsorption branch chain means of the plurality of fixed adsorption branch chain means comprises a connecting bracket, a driving device, an omnidirectional wheel, and an adsorption device in which the connecting bracket is fixedly connected with the fixed platform, wherein the driving device and the adsorption device are fixedly mounted at a lower part of the connecting bracket, and wherein an output shaft of the driving device is connected with the omnidirectional wheel.

12. The adsorption parallel machining robot of claim 11, wherein the end effector comprises a spindle head and a machining device disposed at a lower part of the spindle head.

13. The adsorption parallel machining robot of claim 12, wherein the machining device comprises one or more of a polishing device, a grinding device, an additive manufacturing device, and a welding device.

14. The adsorption parallel machining robot of claim 11, wherein an adsorption method of the adsorption device is electromagnetic adsorption.

15. The adsorption parallel machining robot of claim 11, wherein a friction adsorption locking device is further fixedly mounted at the lower part of the connecting bracket.

16. The adsorption parallel machining robot of claim 15, wherein the friction adsorption locking device comprises a lifting device, a rotating device, and a friction disc; the lifting device is fixedly mounted at the lower part of the connecting bracket and is connected with the rotating device, and the rotating device is equipped with a friction disc at a lower end thereof; the friction disc is equipped with a high friction coefficient material on a lower surface thereof, and a soft brush on an upper surface thereof.

17. The adsorption parallel machining robot of claim 12, wherein an adsorption method of the adsorption device is electromagnetic adsorption.

18. The adsorption parallel machining robot of claim 13, wherein an adsorption method of the adsorption device is electromagnetic adsorption.

19. The adsorption parallel machining robot of claim 12, wherein a friction adsorption locking device is further fixedly mounted at the lower part of the connecting bracket.

20. The adsorption parallel machining robot of claim 13, wherein a friction adsorption locking device is further fixedly mounted at the lower part of the connecting bracket.

* * * * *